US008978035B2

(12) United States Patent  
McGrath et al.

(10) Patent No.: US 8,978,035 B2  
(45) Date of Patent: Mar. 10, 2015

(54) SCALING OF APPLICATION RESOURCES IN A MULTI-TENANT PLATFORM-AS-A-SERVICE ENVIRONMENT IN A CLOUD COMPUTING SYSTEM

(75) Inventors: Michael P. McGrath, Schaumburg, IL (US); Matthew Hicks, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 260 days.

(21) Appl. No.: 13/605,563

(22) Filed: Sep. 6, 2012

(65) Prior Publication Data

US 2014/0068611 A1 Mar. 6, 2014

(51) Int. Cl.
  *G06F 9/455* (2006.01)
  *G06F 9/50* (2006.01)
  *G06F 15/173* (2006.01)

(52) U.S. Cl.
  USPC ............... 718/104; 718/1; 718/105; 709/226

(58) Field of Classification Search
  None
  See application file for complete search history.

(56) References Cited

U.S. PATENT DOCUMENTS

| 8,335,851 B1* | 12/2012 | Vendrow | 709/226 |
| 2013/0179895 A1* | 7/2013 | Calder et al. | 718/104 |
| 2013/0298183 A1* | 11/2013 | McGrath et al. | 726/1 |
| 2013/0326506 A1* | 12/2013 | McGrath et al. | 718/1 |
| 2013/0326507 A1* | 12/2013 | McGrath et al. | 718/1 |

* cited by examiner

*Primary Examiner* — Qing Wu
(74) *Attorney, Agent, or Firm* — Lowenstein Sandler LLP

(57) ABSTRACT

A mechanism for automatic scaling of application resources in a multi-tenant Platform-as-a-Service (PaaS) environment in a cloud computing system is disclosed. A method includes monitoring, by a load balancer executing on a computing device, an overall load measurement of containers associated with an application executed on virtual machines (VMs) in a multi-tenant Platform-as-a-Service (PaaS) system, wherein the overall load measurement is a summation of individual current loads at the containers, comparing, by the load balancer, the overall load measurement to an overall load threshold for the containers, and when the overall load measurement exceeds the overall load threshold, causing resources to be added to execute functionality of the application in the VMs of the multi-tenant PaaS system.

20 Claims, 7 Drawing Sheets

SCALING OF APPLICATION RESOURCES IN A MULTI-TENANT PLATFORM-AS-A-SERVICE ENVIRONMENT IN A CLOUD COMPUTING SYSTEM

TECHNICAL FIELD

The embodiments of the invention relate generally to platform-as-a-service (PaaS) environments and, more specifically, relate to a mechanism for automatic scaling of application resources in a multi-tenant PaaS environment in a cloud computing system.

BACKGROUND

Cloud computing is a computing paradigm in which a customer pays a "cloud provider" to execute a program on computer hardware owned and/or controlled by the cloud provider. It is common for cloud providers to make virtual machines hosted on its computer hardware available to customers for this purpose. The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include software components, such as a kernel and an operating system. Customers that have installed and are executing their programs "in the cloud" typically communicate with the executing program from remote geographic locations using Internet protocols.

For programs that are web applications, the additional software can further include such software components as middleware and a framework. Web applications are programs that receive and act on requests in web or other Internet protocols, such as Hypertext Transfer Protocol (HTTP). It is common for a user to use a web application by using a browser executing on the user's client computer system to send requests in a web protocol via the Internet to a server computer system on which the web application is executing. It is also common for automatic user agents to interact with web applications in web protocols in the same fashion.

While many web applications are suitable for execution in the cloud, it often requires significant expertise and effort in order to install, execute, and manage a web application in the cloud. For example, an administrator typically should identify the software components that a web application needs in order to execute, and what versions of those software components are acceptable. In addition, the administrator typically should obtain, install, and appropriately configure each such software component, as well as the application itself. Where this high level of expertise and effort has been invested in order to get a web application running on a particular hypervisor and in a particular provider's cloud, a similarly high level of expertise and effort usually should be subsequently invested to execute the web application instead or in addition on a different hypervisor and/or in a different particular provider's cloud. Also, it can be difficult to obtain useful information about how the application is performing and otherwise behaving when executing in the cloud.

Accordingly, software and/or hardware facilities for facilitating the execution of web applications in the cloud have been introduced, and are known as Platform-as-a-Service (PaaS) offerings. PaaS offerings typically facilitate deployment of applications without the cost and complexity of buying and managing the underlying hardware and software and provisioning hosting capabilities, providing the facilities required to support the complete life cycle of building and delivering web application and service entirely available from the Internet. Typically, these facilities operate as one or more virtual machines (VMs) running on top of a hypervisor in a host server.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
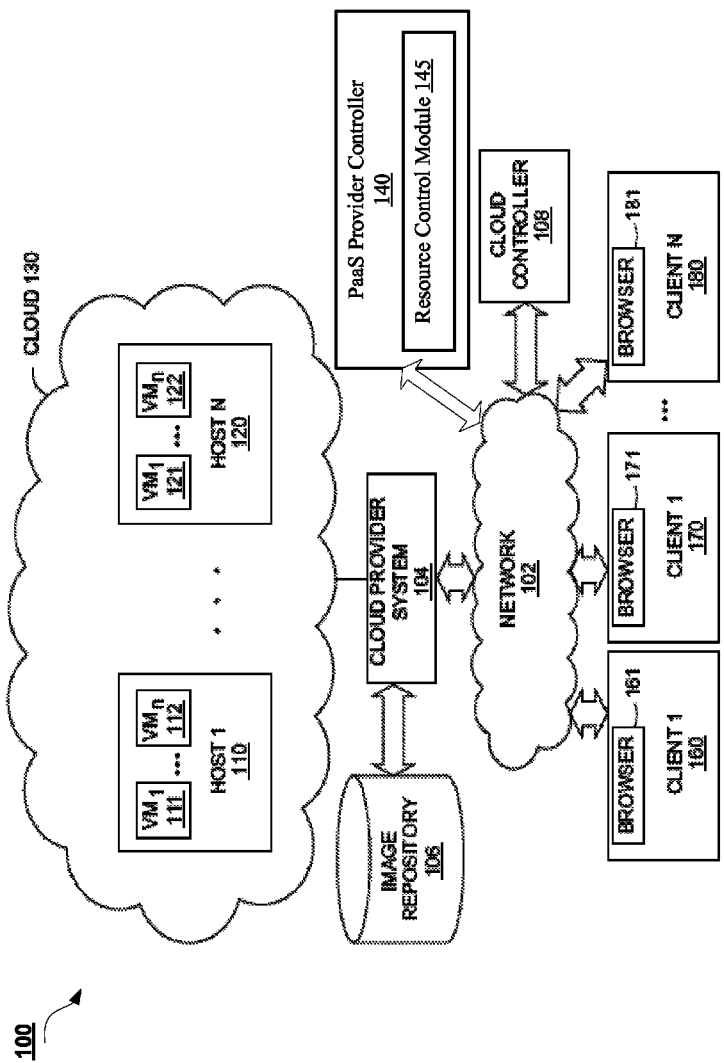
FIG. 1 is a block diagram of a network architecture in which embodiments of the invention may operate.

Embodiments of the invention provide a mechanism for automatic scaling of application resources in a multi-tenant Platform-as-a-Service (PaaS) environment in a cloud computing system. A method of embodiments of the invention includes monitoring, by a load balancer executing on a computing device, an overall load measurement of containers associated with an application executed on virtual machines (VMs) in a multi-tenant Platform-as-a-Service (PaaS) system, wherein the overall load measurement is a summation of individual current loads at the containers, comparing, by the load balancer, the overall load measurement to an overall load threshold for the containers, and when the overall load measurement exceeds the overall load threshold, causing resources to be added to execute functionality of the application in the VMs of the multi-tenant PaaS system.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "executing", "applying", "identifying", "configuring", "establishing", "determining", "pinging", "comparing", "adding", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Embodiments of the invention provide a mechanism for automatic scaling of application resources in a multi-tenant PaaS environment in a cloud computing system. Embodiments of the invention implement automatic scaling in multi-tenant PaaS system to detect and add additional resources automatically as an application's load demand increases or decreases. In current multi-tenant PaaS system, an application may utilize several cartridges, which are run in multiple containers spread out over multiple VMs in the multi-tenant PaaS system. In some embodiments, a load balancer is built into the multi-tenant PaaS system for each application as one of the containers. The load balancer container points to and monitors the other containers in the application that are handling the load, and uses metrics to determine when to add or remove containers. The metrics are based on the overall load of the containers, instead of monitoring individual load of individual containers of the application. The load balancing container also implements additional protections to prevent "thrashing" (adding and removing gears too quickly) by analyzing metrics over, for example, the course of a day (rather than every few minutes).

FIG. 1 is a block diagram of a network architecture 100 in which embodiments of the invention may operate. The network architecture 100 includes a cloud 130 managed by a cloud provider system 104. The cloud provider system 104 provides VMs, such as VMs 111, 112, 121, and 122 hosted in cloud 130. Each VM is hosted on a physical machine, such as host 1 110 through host N 120, configured as part of the cloud 130. In some embodiments, the host machines 110, 120 are often located in a data center. For example, VMs 111 and 112 are hosted on physical machine 110 in cloud 130 provided by cloud provider 104. Users can interact with applications executing on the cloud-based VMs 111, 112, 121, 122 using client computer systems, such as clients 160, 170 and 180, via corresponding web browser applications 161, 171 and 181.

Clients 160, 170 and 180 are connected to hosts 110, 120 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, or any other computing device. Each host 110, 120 may be a server computer system, a desktop computer or any other computing device. The cloud provider system 104 may include one or more machines such as server computers, desktop computers, etc.

In one embodiment, the cloud provider system 104 is coupled to a cloud controller 108 via the network 102. The cloud controller 108 may reside on one or more machines (e.g., server computers, desktop computers, etc.) and may manage the execution of applications in the cloud 130. In some embodiments, cloud controller 108 receives commands from PaaS provider controller 140. Based on these commands, the cloud controller 108 provides data (e.g., such as pre-generated images) associated with different applications to the cloud provider system 104. In some embodiments, the data may be provided to the cloud provider 104 and stored in an image repository 106, in an image repository (not shown) located on each host 110, 120, or in an image repository (not shown) located on each VM 111, 112, 121, 122.

Upon receiving a command identifying specific data (e.g., application data and files used to initialize an application on the cloud), the cloud provider 104 retrieves the corresponding data from the image repository 106, creates an instance of it, and loads it to the host 110, 120 to run on top of a hypervisor (not shown) as a VM 111, 112, 121, 122 or within a VM 111, 112, 121, 122. In addition, a command may identify specific data to be executed on one or more of the VMs 111, 112, 121, 122. The command may be received from the cloud controller 108, from a PaaS Provider Controller 140, or a user (e.g., a system administrator) via a console computer or a client machine. The image repository 106 may be local or remote and may represent a single data structure or multiple data structures (databases, repositories, files, etc.) residing on one or more mass storage devices, such as magnetic or optical storage based disks, solid-state drives (SSDs) or hard drives.

In one embodiment, PaaS provider controller 140 includes a resource control module 145 configured to enable automatic scaling in a multi-tenant PaaS system implemented in cloud 130. The resource control module 145 may implement load balancing components in VMs 111, 112, 121, 122, where the load balancing components implement automatic scaling for each application, or portions of each application, hosted by the multi-tenant PaaS system. In one embodiment, the load balancing components monitor load (e.g., requests) at the applications, or portions of the applications, in order to determine whether additional functional components should be added to the PaaS system or removed from the PaaS system. The PaaS provider controller 140 can interact with cloud provider system 104 to cause capacity of the PaaS system to be increased or decreased accordingly.

While various embodiments are described in terms of the environment described above, those skilled in the art will appreciate that the facility may be implemented in a variety of other environments including a single, monolithic computer system, as well as various other combinations of computer systems or similar devices connected in various ways. For example, the data from the image repository 106 may run directly on a physical host 110, 120 instead of being instantiated on a VM 111, 112, 121, 122.

Figure 2:
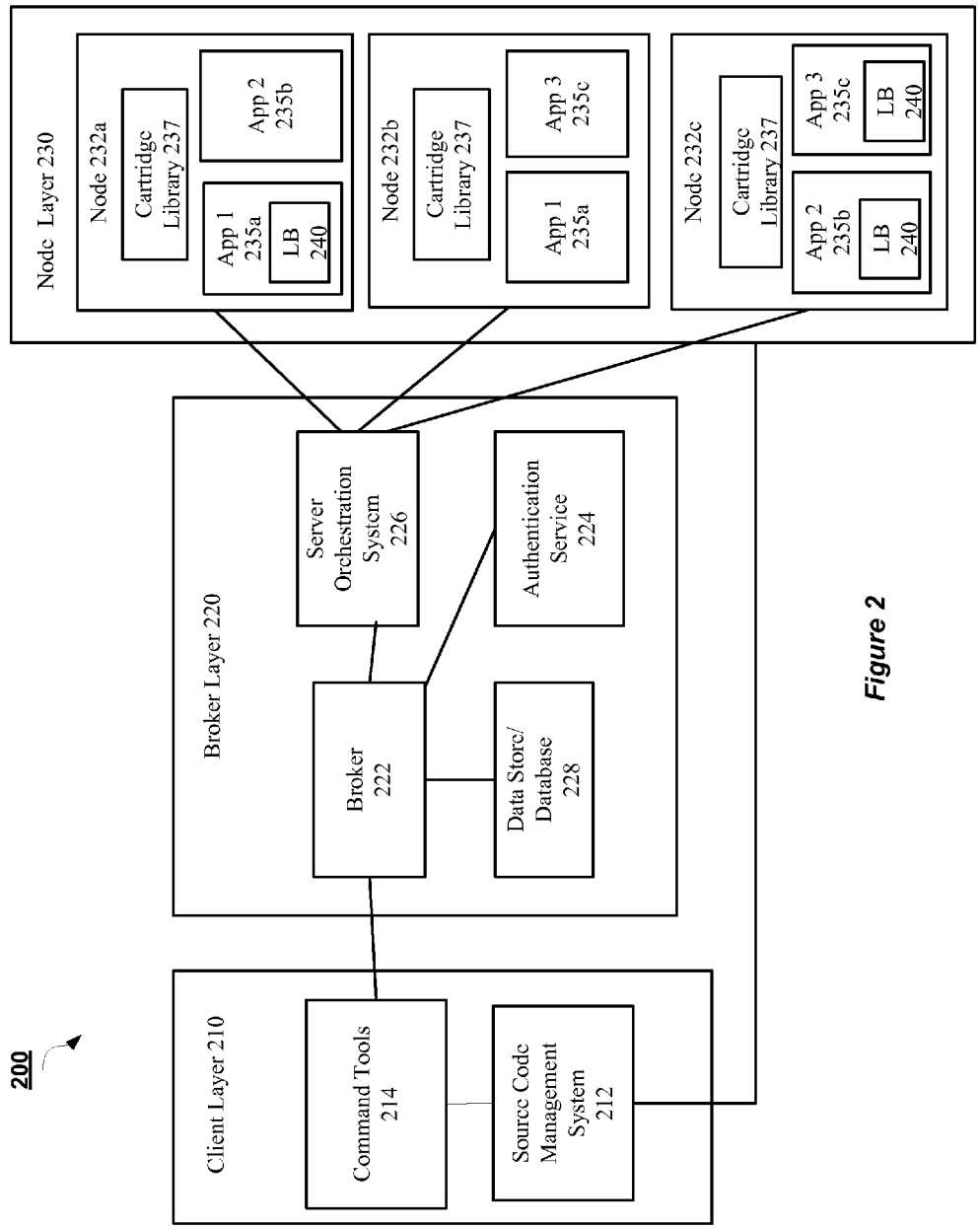
FIG. 2 is a block diagram of a PaaS system architecture according to an embodiment of the invention.

FIG. 2 is a block diagram of a PaaS system architecture 200. The PaaS architecture 200 allows users to launch software applications in a cloud computing environment, such as cloud computing environment provided in network architecture 100 described with respect to FIG. 1. The PaaS system architecture 200, in one embodiment, includes a client layer 210, a broker layer 220, and a node layer 230.

In one embodiment, the client layer 210 resides on a client machine, such as a workstation of a software developer, and provides an interface to a user of the client machine to a broker layer 220 of the PaaS system 200. For example, the broker layer 220 may facilitate the creation and deployment on the cloud (via node layer 230) of software applications being developed by an end user at client layer 210.

In one embodiment, the client layer 210 includes a source code management system 212, sometimes referred to as "SCM" or revision control system. One example of such an SCM or revision control system is Git, available as open source software. Git, and other such distributed SCM systems, usually include a working directory for making changes, and a local software repository for storing the changes. The packaged software application can then be "pushed" from the local Git repository to a remote Git repository. From the remote repository, the code may be edited by others with access, or the application may be executed by a machine. Other SCM systems work in a similar manner.

The client layer 210, in one embodiment, also includes a set of command tools 214 that a user can utilize to create, launch, and manage applications. In one embodiment, the command tools 214 can be downloaded and installed on the user's client machine, and can be accessed via a command line interface or a graphical user interface, or some other type of interface. In one embodiment, the command tools 214 expose an application programming interface ("API") of the broker layer 220 and perform other applications management tasks in an automated fashion using other interfaces, as will be described in more detail further below in accordance with some embodiments.

In one embodiment, the broker layer 220 acts as middleware between the client layer 210 and the node layer 230. The node layer 230 includes the nodes 232a-c on which software applications 235a-c are provisioned and executed. In one embodiment, each node 232a-c is a VM provisioned by an Infrastructure as a Service (IaaS) provider, such as Amazon™ Web Services. In other embodiments, the nodes 232a-c may be physical machines or VMs residing on a single physical machine. In one embodiment, the broker layer 220 is implemented on one or more machines, such as server computers, desktop computers, etc. In some embodiments, the broker layer 220 may be implemented on one or more machines separate from machines implementing each of the client layer 210 and the node layer 230, or may implemented together with the client layer 210 and/or the node layer 230 on one or more machines, or some combination of the above.

In one embodiment, the broker layer 220 includes a broker 222 that coordinates requests from the client layer 210 with actions to be performed at the node layer 230. One such request is new application creation. In one embodiment, when a user, using the command tools 214 at client layer 210, requests the creation of a new application 235a-c, or some other action to manage the application 235a-c, the broker 222 first authenticates the user using an authentication service 224. In one embodiment, the authentication service may comprise custom authentication methods, or standard protocols such as SAML, Oauth, etc. Once the user has been authenticated and allowed access to the system by authentication service 224, the broker 222 uses a server orchestration system 226 to collect information and configuration information about the nodes 232a-c.

In one embodiment, the broker 222 uses the Marionette Collective™ ("MCollective™") framework available from Puppet Labs™ as the server orchestration system 226, but other server orchestration systems may also be used. The server orchestration system 226, in one embodiment, functions to coordinate server-client interaction between multiple (sometimes a large number of) servers. In one embodiment, the servers being orchestrated are nodes 232a-c, which are acting as application servers and web servers.

For example, if the broker 222 wanted to shut down all applications 235a-c on all even numbered nodes out of 100,000 nodes, the broker 222 would only need to provide one command to the server orchestration system 226. Then, the server orchestration system 226 would generate and distribute a message to all nodes 232a-c to shut down all applications 235a-c if the node 232a-c is even, using a messaging and queuing system. Thus, in one embodiment, the broker 222 manages the business logic and model representing the nodes 232a-c and the applications 235a-c residing on the nodes, and acts as a controller that generates the actions requested by users via an API of the client tools 214. The server orchestration system 226 then takes the actions generated by the broker 222 and orchestrates their execution on the many nodes 232a-c managed by the system.

In one embodiment, the information collected about the nodes 232a-c can be stored in a data store 228. In one embodiment, the data store 228 can be a locally-hosted database or file store, or it can be a cloud based storage service provided by a Software-as-a-Service (SaaS) provider, such as Amazon™ S3™ (Simple Storage Service). The broker 222 uses the information about the nodes 232a-c and their applications 235a-c to model the application hosting service and to maintain records about the nodes. In one embodiment, data of a node 232a-c is stored in the form of a JavaScript Object Notation (JSON) blob or string that maintains key-value pairs to associate a unique identifier, a hostname, a list of applications, and other such attributes with the node.

In embodiments of the invention, the PaaS system architecture 200 of FIG. 2 is a multi-tenant PaaS environment. In a multi-tenant PaaS environment, each node 232a-c runs multiple applications 235a-c that may be owned or managed by different users and/or organizations. As such, a first customer's deployed applications 235a-c may co-exist with any other customer's deployed applications on the same node 232 (VM) that is hosting the first customer's deployed applications 235a-c. In some embodiments, portions of an application are run on multiple different nodes 232a-c. For example, as shown in FIG. 2, components of application 1 235a are run in both node 232a and node 232b. Similarly, application 2 235b is run in node 232a and node 232c, while application 3 235c is run in node 232b and node 232c.

In addition, each node also maintains a cartridge library 237. The cartridge library 237 maintains multiple software components (referred to herein as cartridges) that may be utilized by applications 235a-c deployed on node 232a-c. A cartridge can represent a form of support software providing the functionality needed to run an application 235a-c. In one embodiment, the cartridges are maintained that support languages such as JBoss™ PHP, Ruby, Python, Perl, and so on. In addition, cartridges may be provided that support databases, such as MySQL™, PostgreSQL™, Mongo™, and others. Cartridges may also be available that support the build and continuous integration environments, such as a Jenkins cartridge. Lastly, cartridges may be provided to support management capabilities, such as PHPmyadmin, RockMongo™, 10gen-mms-agent, cron scheduler, and HAProxy, for example. Adding an instance of a cartridge from cartridge library 237 to an application 235a-c provides a capability for the application 235a-c without the customer owning the application having to administer or update the included feature.

The deployment of multiple applications 235a-c of multiple customers on a single node 232a-c (VM) is a cost-efficient solution for PaaS providers. However, deploying a multi-tenant PaaS solution raises a variety of concerns, including, for example, how to efficiently control capacity and utilization of the nodes 232a-c in the PaaS system. Embodiments of the invention provide a mechanism to automatically scale resources in a multi-tenant PaaS system when load limits associated with an application 235a-c are reached or when resources of the application are being under-utilized with respect to load on the application 235a-c. Server orchestration system 226 may implement one or more load balancing components 240 per application 235a-c to provide automatic scaling of application processing components (e.g., cartridges) based on the load placed on the application 235a-c. One embodiment of the interaction between the server orchestration system 226 and a node 232a-c to implement automatic scaling for application resources in a multi-tenant PaaS system is now described in more detail with reference to FIG. 3.

Figure 3:
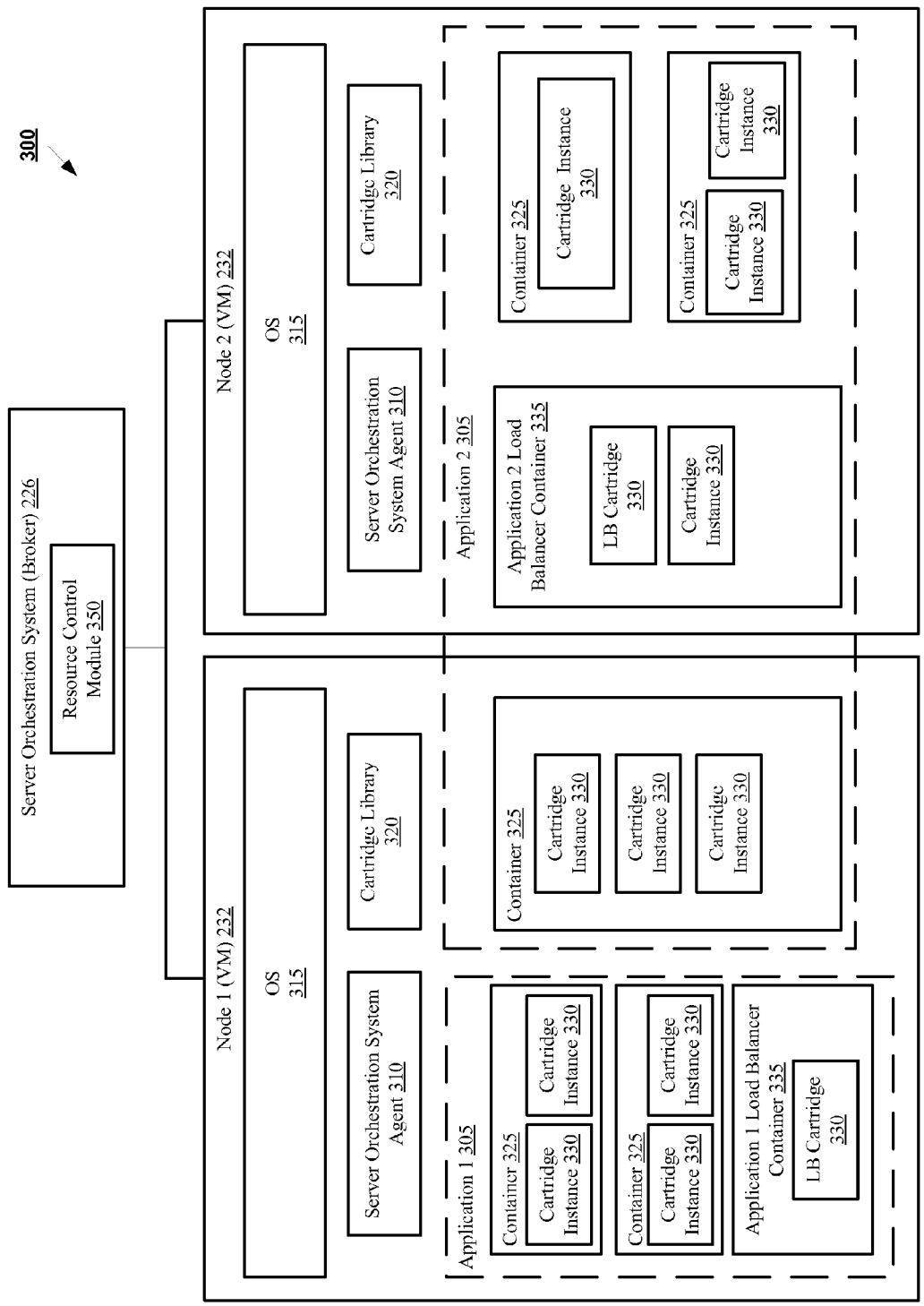
FIG. 3 is a block diagram of a communication infrastructure between a server orchestration system and a node according to embodiments of the invention.

FIG. 3 is a block diagram depicting a communication infrastructure 300 between a server orchestration system 226 and a plurality of nodes 232 according to embodiments of the invention. In one embodiment, server orchestration system 226 and nodes 232 are the same as their counterparts described with respect to FIG. 2. In one embodiment, each node 232 is implemented as a VM and has an operating system 315 that can execute applications 305 using the cartridge library 320 that are resident on the nodes 232. In one embodiment, applications 305 are the same as applications 235a-c described with respect to FIG. 2.

Each node 232 also includes a server orchestration system agent 310 configured to track and collect information about the node 232 and to perform actions on the node 232. Thus, in one embodiment, using MCollective™ as the server orchestration system 226, the server orchestration system agent 310 can act as a MCollective™ server. The server orchestration system 226 would then act as the MCollective™ client that can send requests, queries, and commands to the MCollective™ server on node 232.

As previously mentioned, cartridges provide the underlying support software that implements the functionality of applications 305. In one embodiment, an application 305 may utilize one or more cartridge instances 330 that are run in one or more resource-constrained containers 325 on nodes 232. Cartridge library 320 provides an OS 315-based location, outside of all application containers 325, that acts as a source for cartridge instantiations 330 that provide functionality for an application 305. An application 305 may use more than one cartridge instance 330 as part of providing functionality for the application 305. One example of this is a JavaEE application that uses a JBoss™ AS7 cartridge with a supporting MySQL™ database provided by a MySQL™ cartridge. Each cartridge instance may include a software repository that provides the particular functionality of the cartridge instance 330.

A container 325 is a resource-constrained process space on the node 232 to execute functionality of an application. In some embodiments, a container 325 is established by the node 232 with resource boundaries, including a limit and/or designation of the amount of memory, amount of storage, and security types and/or labels to be applied to any functions executed by the container 325. In one embodiment, containers 325 may be established using the Linux Containers (LXC) virtualization method. In further embodiments, containers may also be established using cgroups, SELinux™, and kernel namespaces, to name a few examples.

In some embodiments, a container 325 is also known as a gear. In some embodiments, cartridges instances 330 for an application 305 may execute in containers 325 dispersed over more than one node 232, as shown with application 2 305 illustrated in FIG. 3. In other embodiments, cartridge instances 330 for an application 305 may run in one or more containers 325 on the same node 232, as shown with application 1 in FIG. 3.

In one embodiment, the server orchestration system broker 226 includes a resource control module 350 that manages capacity and utilization of nodes 232 in the multi-tenant PaaS system. The resource control module 350 may also enable automatic scaling of resources on a per-application basis in the multi-tenant PaaS system by implementing one or more load balancing containers 335 for each application in the multi-tenant PaaS system. In some embodiments, such as for a high-scale or high-redundancy application, the application 305 implements more than one load balancer container 335 to direct work requests for the application 305.

In one embodiment, a load balancing container 335 includes a load balancing cartridge 330 that implements the functionality of a load balancer. One example load balancing cartridge 330 is a HAProxy cartridge. One skilled in the art will appreciate that other load balancing cartridges 330 implementing different load balancing functionality may also be utilized by embodiments of the invention. In yet other embodiments, a load balancing cartridge 330 may be executed in other containers 325 associated with an application that are not solely used for load balancing purposes.

In one embodiment, the load balancing container 335 for an application 305 receives a workload request (e.g., frontend network traffic request, back-end database request) and distributes this request to another container 325 of the application 305 to achieve optimal resource utilization, maximized throughput, minimized response time, and/or reduced overload. In the case of a network traffic request, such as an HTTP or Transmission Control Protocol (TCP) request, the load balancer container 335 receives the request from the end user through node 232 in a reverse proxy set-up. In the case of a back-end database request, the load balancer container 335 receives the request from a container 325 of the application 305 running a database cartridge instance 330.

In embodiments of the invention, a load balancer container 335 and its associated load balancer cartridges 330 monitor overall load demand for the associated application 305. Based on the monitored overall load demand for the application 305, the load balancer container 335 can interact with the resource control module 350 to add or remove containers 325 for an application 305.

With respect to increasing the scale of resources for an application based on load demand, a load balancer container 335 monitors overall load on all of the containers 325 that it monitors. The load balancer container 335 may request a new container 325 to be added to an application when the total overall load on the monitored containers 325 (e.g., summation of current load on all monitored containers 325) reaches a threshold level. Each container 325 monitored by a load balancer container 335 is configured with a maximum amount of work requests that the container 325 may handle. In one embodiment, resources control module 350 provides the load balancer container 335 with the workload/demand capacity for each container 325 that the load balancer container 335 monitors when the monitored container 325 is initialized. This determination of the work requests that a container may handle can be based on a collection of information included, but not limited to, the cartridges installed in that container, the resource limitations of the container and the historical behaviors of the overall application.

In one embodiment, instead of monitoring individual load on each container 325, the load balancer container 335 monitors an overall load on all of the monitored containers 325. The load balancer container 335 may determine a maximum overall load for all of its monitored containers by summing each of the maximum loads of each monitored container 325 together. For example, if the load balancer container 335 monitors 8 containers 325 each with a maximum load of 10 connections, then the overall maximum load to be monitored by the load balancer container 335 is 80 connections. In one embodiment, the load balancer container 335 is configured with a threshold level, such as a percentage of total maximum load (e.g., 85%) or a discrete amount of load (e.g., 70 connections), that triggers the load balancer container 335 to request additional resources (e.g., containers 325 with associated cartridges 330) for the application 305.

With respect to decreasing the scale of resources for an application based on load demand, the load balancer container 325 also monitors the overall load on its monitored container 325. In some embodiments, the load balancing container 335 may implement additional conditions to be met before a request to remove application resources (e.g., containers 325 with respective cartridges 330) is made. These additional conditions may be implemented to avoid "thrashing" of the application. "Thrashing" refers to a condition where resources (e.g., containers 335 and cartridges 330) are frequently added and removed as the overall load demand on the application oscillates and triggers the scaling thresholds. In such a situation, the constant adding and removal of resources is inefficient for the application due to the initial overhead in initializing or removing these resources.

In one embodiment, thrashing protection is built into the load balancer container 335 for purposes of removing resources from the application. The thrashing protection may include multiple conditions that should be satisfied before a request to remove an application resource is initiated. In one example, the thrashing protections may include allowing a request to remove application resources when overall load has dropped below 50% overall capacity for the last 4 checks in a row, with no new resources being added in the past 5 minutes, and without a resource (e.g., container 325) being removed in the last 3 minutes. If all the above conditions are met, then a request to remove resources my proceed. One skilled in the art will appreciate that a variety of thrashing protection combinations may be implemented so that an application is not in a constant state of adding and removing containers 325.

In some embodiments, the load balancing container 335 is configured to be liberal when adding resources to an application 305, while being conservative when removing resources from an application 305. This may provide an improved performance experience for an end user of the multi-tenant PaaS system at the same time as allowing capacity to drop off when indicated for cost-effective pricing.

Figure 4:
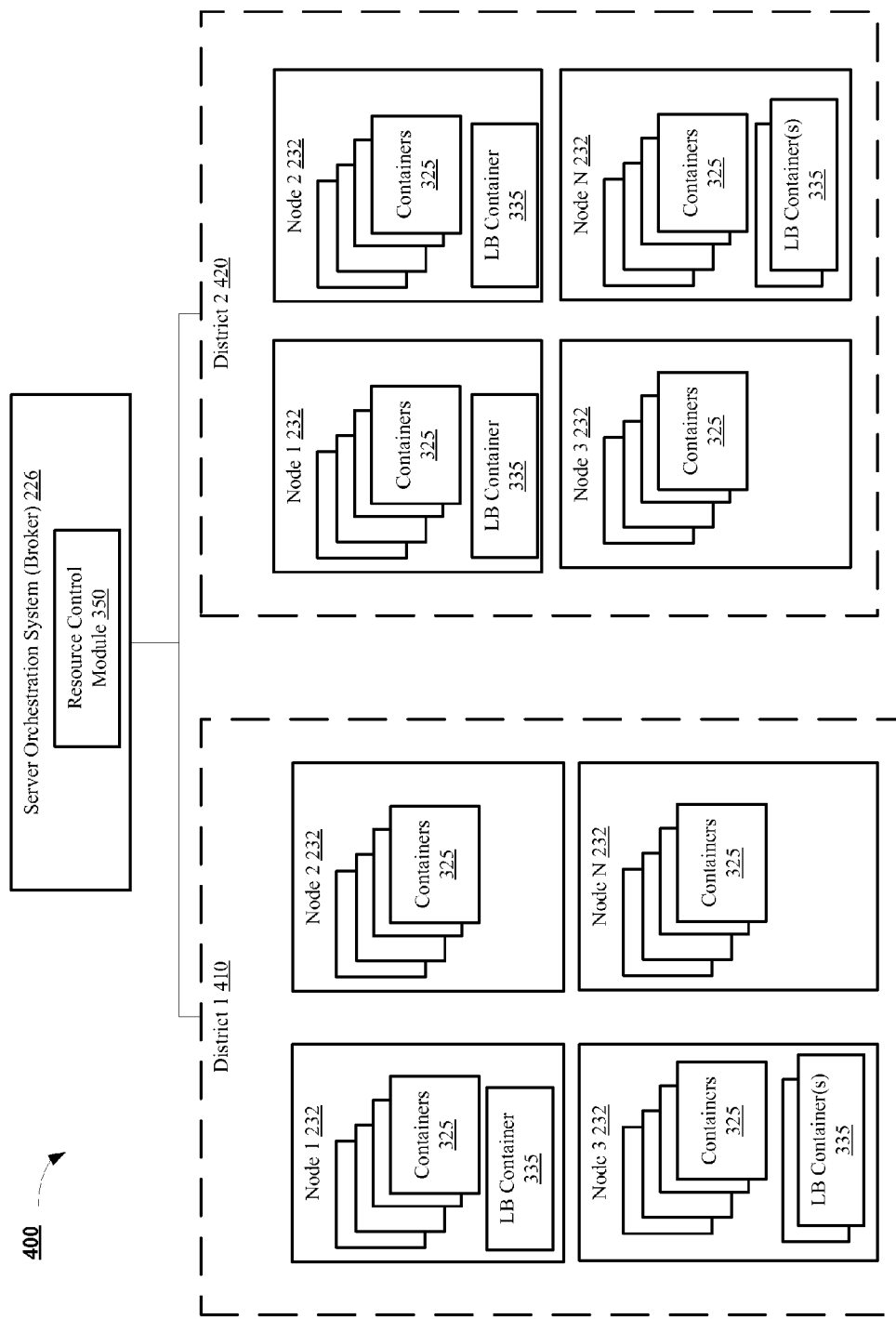
FIG. 4 is a block diagram depicting a multi-tenant PaaS system having a resource control module at the broker layer that implements automatic scaling of application resources according to an embodiment of the invention.

FIG. 4 is a block diagram depicting a multi-tenant PaaS system 400 having a resource control module 350 at the broker layer that implements automatic scaling of application resources according to an embodiment of the invention. In one embodiment, the resource control module 350 is the same as resource control module 350 described with respect to FIG. 3. The resource control module 350 maintains configuration data regarding the load capacities for applications, and their associated threshold levels, for each node 232 in a PaaS system. Each node 232 executes one or more containers 325. Nodes 232 and containers 325 correspond to their counterparts described in FIG. 3.

Nodes 232 are further grouped into districts 410, 420. Although only two districts 410, 420 are illustrated, one skilled in the art will appreciate that server orchestration system 226 may manage multiple (more than two) districts within a PaaS system. In one embodiment, a district 410, 420 is a collection of nodes 232 that is given a dedicated set of Internet Protocol (IP) addresses, ports, and security labels (such as SELinux™ security labels) to share. As such, two nodes 232 in the same district 410, 420 should not have any containers 325 that conflict with each other in terms of IP address, ports, or security labels.

Each district 410, 420 has a maximum total number of containers 325 that can be provisioned in the district 410, 420. For instance, if a district 410, 420 limits a finite resource for the application that must be unique across the district, such as the numbers of ports that can be utilized, that resource, in turn, limits the total number of applications in the district. As such, in this embodiment, the district 410, 420 is limited to 6,000 containers 325 in order to avoid conflicts between containers 325 in a district 410, 420.

In embodiments of the invention, a load balancing container 335 may balance load for an application across containers 325 for an application executed in different nodes 232 and districts 410, 420. In some embodiments, such as in the case of high-scale application and/or highly-available application, multiple load balancer containers 335 may be distributed across different nodes 232 and districts 410, 420 to reduce the possibility of losing load balancer containers 335 due to failure of one or more nodes 232.

Figure 5:
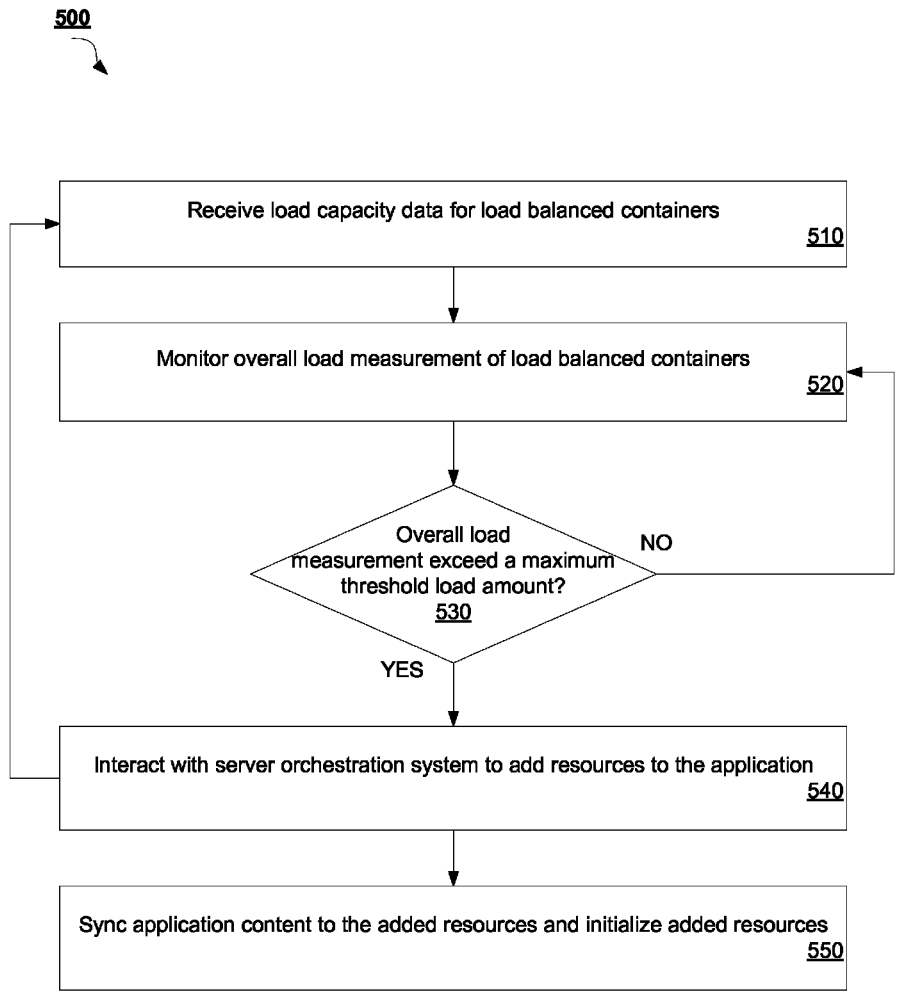
FIG. 5 is a flow diagram illustrating a method for increasing the scale of an application in a multi-tenant PaaS system according to an embodiment of the invention.

FIG. 5 is a flow diagram illustrating a method 500 for increasing the scale of an application in a multi-tenant PaaS system according to an embodiment of the invention. Method 500 may be performed by processing logic that may comprise hardware (e.g., circuitry, dedicated logic, programmable logic, microcode, etc.), software (such as instructions run on a processing device), firmware, or a combination thereof. In one embodiment, method 500 is performed by a load balancer container executing on a computing device, such as load balancer container 335 described with respect to FIGS. 3 and 4.

Method 500 begins at block 510 where load capacity data is received for each container of an application that is load balanced by the load balancer container. In one embodiment, the load capacity is a maximum amount of work requests that a particular container can maintain and/or process at a single time. In some embodiments, the work requests include network traffic requests (such as HTTP requests and/or TCP requests) or include database requests (such as MySQL requests or NoSQL requests). In one embodiment, an administrator configures the load capacity at a resource control module of a server orchestration system and passes this information to the load balancer container.

At block 520, the overall load capacity of the load-balanced application containers is monitored. In one embodiment, the overall load capacity is the sum of all current load measurement for each monitored container. In particular, the load balancer container monitors overall load capacity instead of monitoring individual load at each load-balanced container. In some embodiments, the load balancer container monitors application containers that may be distributed across multiple nodes and/or districts of the multi-tenant PaaS system.

Then, at decision block 530, the load balancer container determines whether the monitored overall load exceeds a maximum threshold load amount. In one embodiment, the determination at decision block 530 is made at predetermined time intervals. In other embodiments, the determination is a continuous assessment made anytime overall load changes. In one embodiment, the maximum threshold value may be a percentage of the overall maximum load of all of the monitored containers. In some embodiments, an administrator of a server orchestration system configures the maximum threshold value.

If the overall load does not exceed the threshold load amount at decision block 530, then method 500 returns to block 520 to continue monitoring the overall load capacity of the application containers. On the other hand, if the overall load does exceed the threshold load amount, then method 500 proceeds to block 540 to interact with a server orchestration system in order to add resources to the application. In one embodiment, the resources to add include additional containers and cartridges to execute functionality of the application. Lastly, at block 550, the application content is synchronized to the added resources, and the added resources are then initialized.

Figure 6:
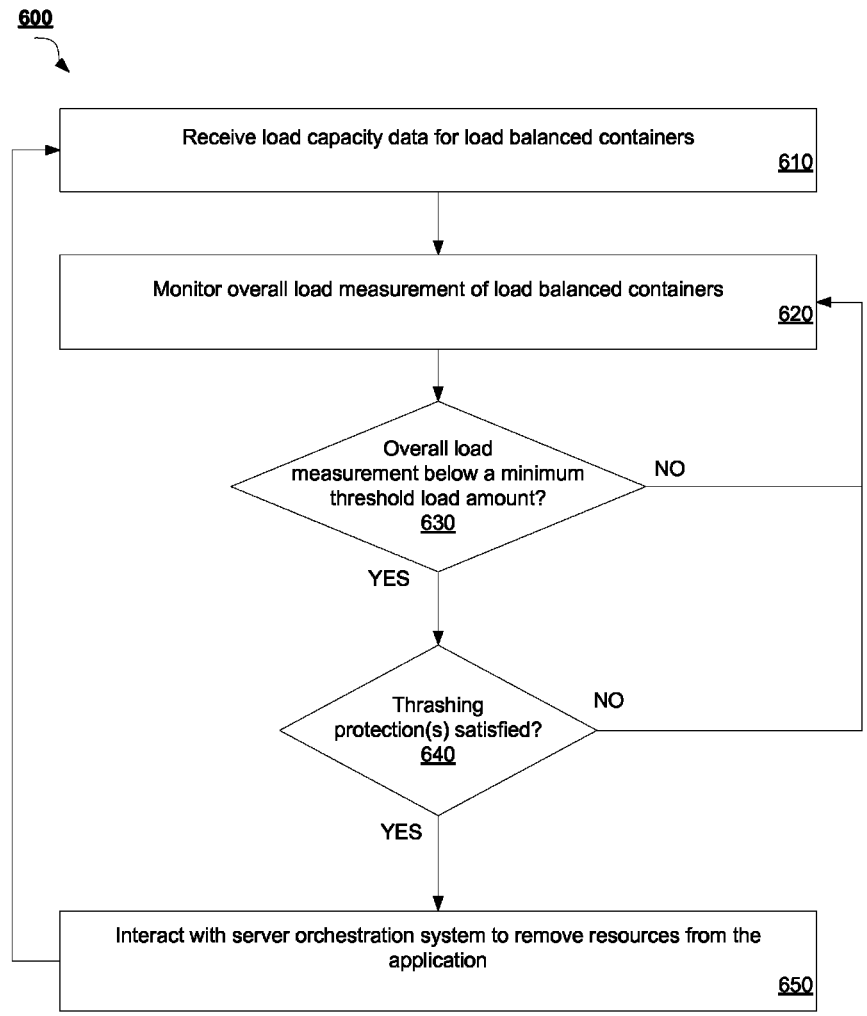
FIG. 6 is a flow diagram illustrating a method for decreasing the scale of an application in a multi-tenant PaaS system according to an embodiment of the invention.

FIG. 6 is a flow diagram illustrating a method 600 for decreasing the scale of an application in a multi-tenant PaaS system according to an embodiment of the invention. Method 600 may be performed by processing logic that may comprise hardware (e.g., circuitry, dedicated logic, programmable logic, microcode, etc.), software (such as instructions run on a processing device), firmware, or a combination thereof. In one embodiment, method 600 is performed by a load balancing container executing on a computing device, such as load balancer container 335 described with respect to FIGS. 3 and 4.

Method 600 begins at block 610 where load capacity data is received for each container that is load balanced for an application by the load balancer container. In one embodiment, the load capacity is a maximum amount of work requests that a particular container can maintain and/or process at a single time. In some embodiments, the work requests include network traffic requests (such as HTTP requests and/or TCP requests) or include database requests (such as MySQL requests or NoSQL requests). In one embodiment, an administrator configures the load capacity at a resource control module of a server orchestration system and passes this information to the load balancer container.

At block 620, the overall load capacity of the load-balanced application containers is monitored. In particular, the load balancer container monitors overall load capacity of all load balanced containers, instead of monitoring individual load at each load-balanced container. In some embodiments, the load balancer container monitors application containers that may be distributed across multiple nodes and/or districts of the multi-tenant PaaS system. Then, at decision block 630, the load balancer container determines whether the monitored overall load falls below a minimum threshold load amount. In one embodiment, the determination at decision block 630 is made at predetermined time intervals. In other embodiments, the determination is a continuous assessment made anytime overall load changes.

In one embodiment, the minimum threshold value may be a percentage of the overall maximum load of all of the monitored containers. In some embodiments, an administrator at a server orchestration system configures the minimum threshold value. In one embodiment, the minimum threshold load amount is different than a maximum threshold load amount used to determine when resources should be added. In other embodiments, the threshold load amounts (maximum and minimum) are the same.

If the overall load does not fall below the minimum threshold load amount at decision block 630, then method 600 returns to block 620 to continue monitoring the overall load capacity of the application containers. On the other hand, if the overall load does fall below the threshold load amount, then method 600 proceeds to decision block 640 where a further determination is made as to whether one or more thrashing protections have been satisfied.

In one embodiment, the thrashing protections are additional conditions that should be met in terms of load analysis in order to prevent the application from being in a constant state of adding and removing resources based on overall load fluctuations at the application. In one embodiment, the thrashing protections include a number of contiguous previous checks that the overall load fell below the threshold, a time interval that resources have not been added to the application, and/or a time interval that resources have not been removed from the application, and so on.

If the thrashing protections are not satisfied at decision block 640, then method 600 returns to block 620 to continue monitoring the overall load capacity of the application containers. On the other hand, if the thrashing protections are satisfied, then method 600 proceeds to block 650 to interact with a server orchestration system to remove resources from the application. In one embodiment, the resources to remove from the application include existing containers and cartridges of the application. In some embodiments, the containers being removed remain active until their current executing processes had finished. In such a case, no new work requests are assigned to these containers.

Figure 7:
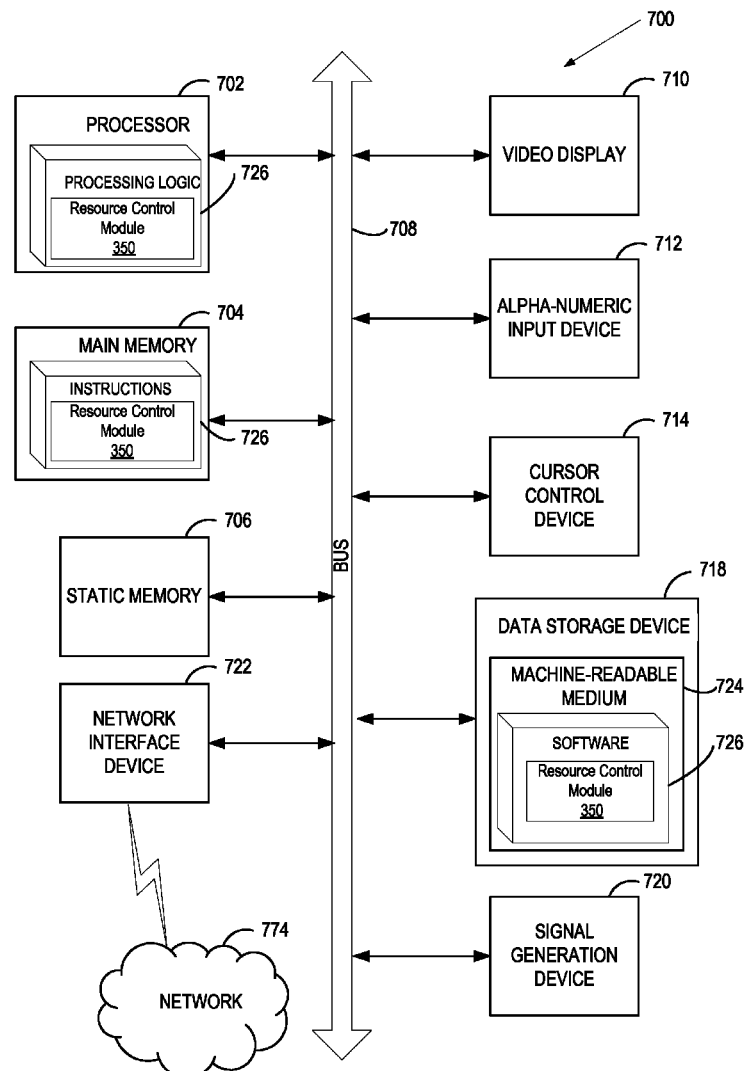
FIG. 7 illustrates a block diagram of one embodiment of a computer system.

FIG. 7 illustrates a diagrammatic representation of a machine in the example form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 726 for performing the operations and steps discussed herein, illustrated in FIG. 7 by depicting instructions 726 within processor 702.

The computer system 700 may further include a network interface device 722. The computer system 700 also may include a video display unit 710 (e.g., a liquid crystal display (LCD), a cathode ray tube (CRT), or a touchscreen), an alphanumeric input device 712 (e.g., a keyboard), a cursor control device 714 (e.g., a mouse), and a signal generation device 720 (e.g., a speaker).

The data storage device 718 may include a machine-readable storage medium 724 (also known as a computer-readable storage medium) on which is stored software 726 (e.g., one or more sets of instructions, software, etc.) embodying any one or more of the methodologies or functions described herein. The software 726 may also reside, completely or at least partially, within the main memory 704 (e.g., instructions 726) and/or within the processor 702 (e.g., processing logic 726) during execution thereof by the computer system 700, the main memory 704 and the processor 702 also constituting machine-readable storage media. The software 726 may further be transmitted or received over a network 774 via the network interface device 722.

In one embodiment, the software 726 include instructions for a resource control module 350, which may correspond to resource control module 350 of FIG. 3, and/or a software library containing methods that call the resource control module for automatic scaling in a multi-tenant PaaS environment in a cloud computing system. While the machine-readable storage medium 724 is shown in an example embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing, encoding or carrying a set of instructions for execution by the machine and that cause the machine to perform any one or more of the methodologies of the present invention. The term "machine-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
    monitoring, by a load balancer executed by a processing device, an overall load measurement of containers associated with an application executed on virtual machines (VMs) in a multi-tenant Platform-as-a-Service (PaaS) system, wherein the overall load measurement is a summation of individual current loads at the containers;
    comparing, by the load balancer, the overall load measurement to an overall load threshold for the containers; and
    when the overall load measurement exceeds the overall load threshold, causing resources to be added to execute functionality of the application in the VMs of the multi-tenant PaaS system.

2. The method of claim 1, wherein each of the containers in the VMs comprise a resource-constrained process space of each VM to execute a component of the application, wherein the application is one of a plurality of applications executed by the VMs and having different owners.

3. The method of claim 1, wherein a load of the overall load measurement comprises a work request directed to the application, the work request comprising at least one of a network traffic request or a database request.

4. The method of claim 1, wherein the overall load threshold comprises a percentage of a maximum overall load capacity of the monitored containers.

5. The method of claim 4, wherein the maximum overall load capacity is a summation of a maximum total load capacity configured for each of the monitored containers.

6. The method of claim 5, further comprising receiving, from a resource control module of the multi-tenant PaaS system, data comprising the maximum total load capacity configured for each of the monitored containers.

7. The method of claim 1, wherein the causing resources to be added further comprises requesting a resource control module of the multi-tenant PaaS system to provision one or more containers and associated cartridges for the application in one or more of the VMs of the multi-tenant PaaS system.

8. The computer implemented method of claim 7, wherein the resource control module operates on a broker layer of the multi-tenant PaaS system, wherein the multi-tenant PaaS system is implemented in a cloud computing system.

9. The computer implemented method of claim 1, wherein the application executes in one or more of the VMs distributed across one or more districts of the multi-tenant PaaS system, wherein the one or more districts comprise a collection of the VMs that is given a dedicated set of Internet Protocol (IP) addresses, ports, and security labels to share when executing the containers within the VMs of the district.

10. A system, comprising:
    a memory;
    a processing device communicably coupled to the memory; and
    a resource control module executable from the memory by the processing device, the resource control module to:
        provide capacity load configuration data to a load balancer associated with an application executed on virtual machines (VMs) in a multi-tenant Platform-as-a-Service (PaaS) system of the resource control module;
        initialize resources for the application in response to an add request sent by the load balancer, the add request sent when an overall load measurement of containers of the application exceeds a maximum overall load threshold for the containers; and
        remove resources from the application in response to a remove request sent by the load balancer, the remove request sent when the overall load measurement of the containers of the application falls below a minimum overall load threshold for the containers and when thrashing protections for the overall load measurement are satisfied.

11. The system of claim 10, wherein each of the containers in the VMs comprise a resource-constrained process space of each VM to execute a component of the application, wherein the application is one of a plurality of applications executed by the VMs and having different owners.

12. The system of claim 10, wherein the thrashing protections comprise at least one of a number of contiguous previous checks that the overall load measurement fell below the minimum overall load threshold, a time interval that resources have not been added to the application, or a time interval that resources have not been removed from the application.

13. The system of claim 10, wherein a load of the overall load measurement comprises a work request directed to the application, the work request comprising at least one of a network traffic request or a database request.

14. The system of claim 10, wherein the overall load measurement is a summation of individual current load at each monitored container.

15. The system of claim 10, wherein the resource control module operates on a broker layer of the multi-tenant PaaS system, and wherein the multi-tenant PaaS system is implemented in a cloud computing system.

16. A non-transitory machine-readable storage medium including instructions that, when accessed by a processing device, cause the processing device to perform operations comprising:
    monitoring, by a load balancer executed by the processing device, an overall load measurement of containers associated with an application executed on virtual machines (VMs) in a multi-tenant Platform-as-a-Service (PaaS) system, wherein the overall load measurement is a summation of individual current loads at the containers;
    comparing, by the load balancer, the overall load measurement to an overall load threshold for the containers;
    when the overall load measurement falls below the overall load threshold, determining whether thrashing protections are satisfied for the overall load measurement; and
    when the thrashing protections are satisfied, causing resources to be removed from the application in the VMs of the multi-tenant PaaS system.

17. The non-transitory machine-readable storage medium of claim 16, wherein each of the containers in the VMs comprise a resource-constrained process space of each VM to execute a component of the application, wherein the application is one of a plurality of applications executed by the VMs and having different owners.

18. The non-transitory machine-readable storage medium of claim 16, wherein the thrashing protections comprise at least one of a number of contiguous previous checks that the overall load measurement fell below the overall load threshold, a time interval that resources have not been added to the application, or a time interval that resources have not been removed from the application.

19. The non-transitory machine-readable storage medium of claim 16, wherein causing resources to be removed from the application further comprises requesting a resource control module of the multi-tenant PaaS system to remove one or more containers and associated cartridges from one or more of the VMs executing the application in the multi-tenant PaaS system.

20. The non-transitory machine-readable storage medium of claim 16, wherein the resource control module operates on a broker layer of a Platform-as-a-Service (PaaS) system that comprises the VM, the PaaS system implemented in a cloud computing system.

* * * * *